United States Patent [19]
Andrzejak et al.

[11] Patent Number: 5,379,646
[45] Date of Patent: Jan. 10, 1995

[54] SEATBACK LOAD APPLYING DEVICE

[75] Inventors: Dennis V. Andrzejak, Royal Oak; William E. Hering, Washington; David C. Viano, Bloomfield Hills, all of Mich.

[73] Assignee: General Motors Corporation, Detroit, Mich.

[21] Appl. No.: 123,209

[22] Filed: Sep. 20, 1993

[51] Int. Cl.⁶ .............................................. G01N 19/00
[52] U.S. Cl. .................. 73/804; 73/862.542; 73/865.9; 73/866.4; 92/161; 901/16; 901/48
[58] Field of Search ............ 73/804, 862.541, 862.542, 73/862.621, 865.9, 866.4; 92/161, 261; 901/16, 48

[56] References Cited

U.S. PATENT DOCUMENTS

| | | | |
|---|---|---|---|
| 3,592,041 | 7/1971 | Spencer | 73/865.9 |
| 3,841,163 | 10/1974 | Daniel | 73/866.4 |
| 4,229,136 | 10/1980 | Panissidi | 901/16 |
| 4,527,942 | 7/1985 | Smith | 901/48 |

FOREIGN PATENT DOCUMENTS 2463924  2/1981  France ................. 73/865.9

OTHER PUBLICATIONS

New Product Release-Standardized Robotic Components, Mack Corp. Oct. 15, 1983.

*Primary Examiner*—Edward K. Look
*Assistant Examiner*—F. Daniel Lopez
*Attorney, Agent, or Firm*—Ernest E. Helms

[57] ABSTRACT

A seatback load applying device that is capable of applying quasi-static and controlled loading along various points of an automobile seatback starting at a predetermined distance above the H-point of a seated surrogate and ending at the upper cross member of the seatback.

10 Claims, 2 Drawing Sheets

SEATBACK LOAD APPLYING DEVICE

This invention concerns load applying devices in general and more particularly relates to such a device for the purpose of determining the deflection characteristics of a seatback portion of a seat assembly.

BACKGROUND OF THE INVENTION

In order to design improved seat hardware for automobiles, it is helpful to determine the bending and torsional characteristics of the seatback portion of a seat assembly. By so doing, one is able to establish more readily seat deformation characteristics and criteria which can improve occupant retention on the seat and define biomechanical responses when subjected to rear-end impact loads. In addition, the bending and torsional characteristics of a seatback portion could also provide preliminary data for dynamic sled tests investigating the characteristics of seats modified to include energy absorbing or occupant retention concepts.

One type of seatback load applying device used currently for determining the bending and torsional stiffness of a seatback utilizes a hydraulic cylinder which applies a load through the upper cross member of the seatback. In other words, the load is applied only at a single point and at the highest cross member of the seatback. One problem with this form of load applying device is that it does not provide a real world scenario in which the loading of the seatback can occur initially at a lower portion of the seatback and afterwards at higher levels as an occupant moves in the seat.

SUMMARY OF THE INVENTION

Accordingly, the objects of the present invention are to provide a new and improved seatback load applying device which can be used for improving the design of a vehicle seat that may be subjected to rear loading; to provide a new and improved seatback load applying device which provides data useful in the design of seat hardware by having the occupant load distributed over the eraire seatback; to provide a new and improved seatback load applying device that simulates occupant loading into a seatback in a quasi-static test procedure; and to provide a new and improved load applying device that is capable of applying quasi-static and core rolled loading along various points of an automobile seatback starting at a predetermined distance above the H-point of a seated surrogate and ending at the upper cross member of the seatback and head restraint.

The above objects and others are realized in accordance with the present invention by providing a load applying device which is adapted to apply a horizontal load to a seat assembly positioned adjacent to the device. The seat assembly includes a seatback portion and a cushion portion and is located in a fixed position adjacent to a longitudinally extendable force applying member having one end thereof mourned on a carriage. In the preferred form, the force applying member takes the form of a hydraulic cylinder. The carriage is carried by a stanchion for movement along a horizontal axis and a vertical axis. and the weight of the carriage combined with the hydraulic cylinder is counterbalanced vertically by an equivalent weight. During operation of the load applying device, a dummy is seated in the seat assembly and the piston rod end of the hydraulic cylinder is connected to the dummy. The hydraulic cylinder member is then activated so as to apply a rearwardly directed horizontal load to the seatback through the dummy. As the seatback portion pivots rearwardly as a result of the load being applied by the hydraulic cylinder, the dummy moves upwardly relative to the seatback portion causing the loading to be applied at various points of the seatback portion. In addition, suitable instrumentation is incorporated with the seat assembly and various parts of the force applying device so as to provide data relative to the forces applied to the seatback and the amount of deflection of the latter.

A more complete understanding of the present invention can be obtained from the following detailed description when taken with the drawings in which:

DETAILED DESCRIPTION OF THE PREFERRED EMBODIMENT

Figure 1:
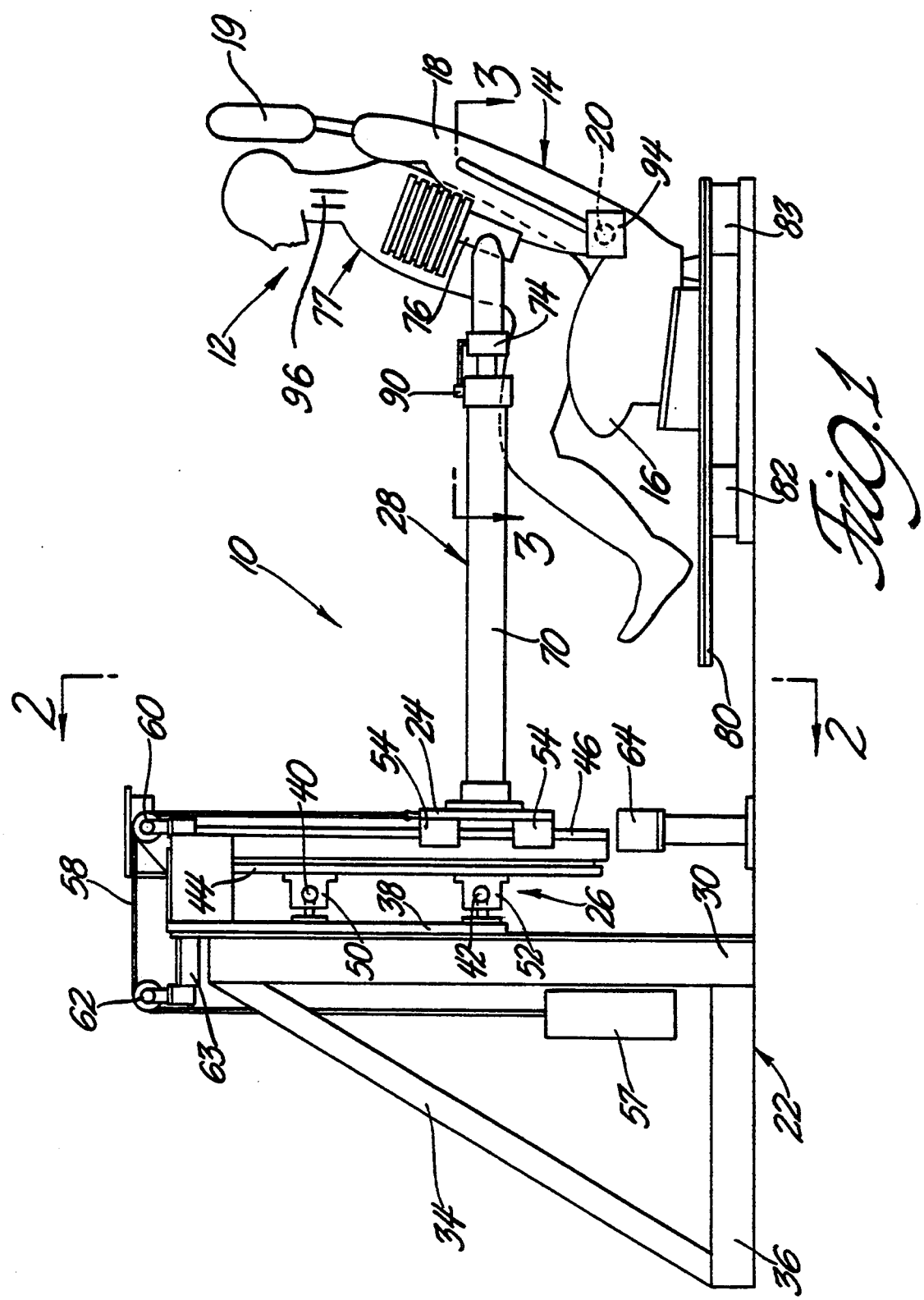
FIG. 1 is a side elevation view of a load applying device made in accordance with the present invention.

Referring now to the drawings and more particularly to FIG. 1 thereof, a seatback load applying device 10, made in accordance with the invention, is shown located adjacent to a test seat station 12 which supports a seat assembly 14. The seat assembly 14 includes a cushion portion 16 and a seatback portion 18, the latter of which, in this instance, is connected on the opposite sides thereof by a conventional recliner mechanism (not shown) of the type currently provided on General Motors Corporation vehicles that allows the seatback portion 18 to maintain the position shown and, when desired, allows the seatback portion 18 and head restraint 19 to be tilted rearwardly about a pivotal connection 20. Although the seat assembly 14 shown is of the type described above, it should be understood that any type of seat assembly can be subjected to the force of the load applying device 10. In other words, the seat assembly 14 could have a cushion portion that is rigidly secured to the seatback portion, or the seatback portion could be of the type found in two-door vehicles in which the seatback portion does not include a recliner mechanism but normally maintains the position shown in FIG. 1 and can be tilted forwardly for allowing a passenger to gain access to the rear seat area of the vehicle.

Figure 2:
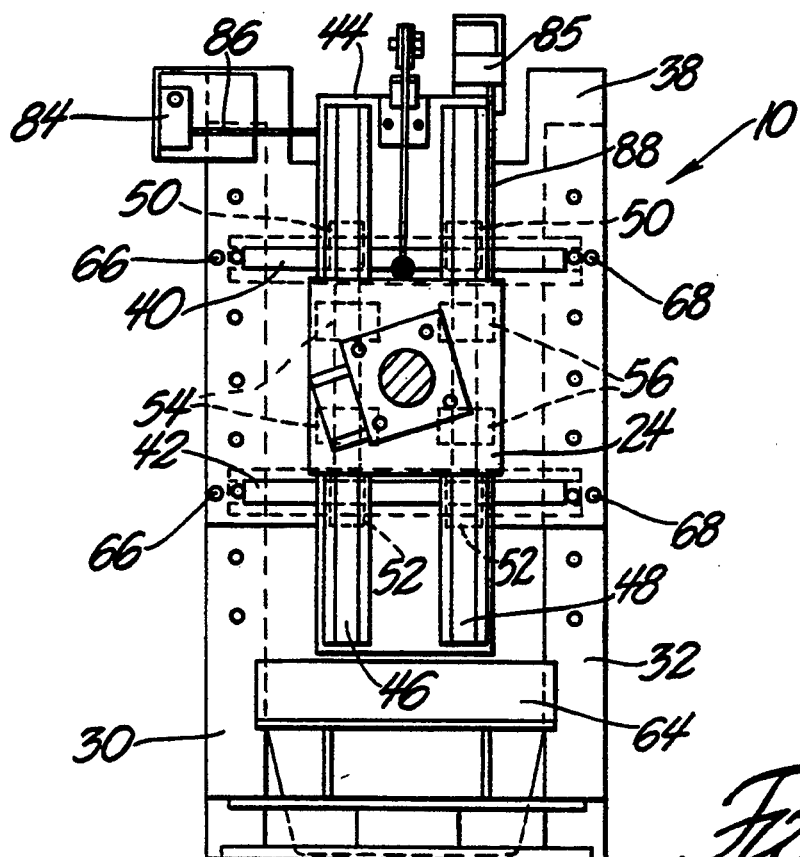
FIG. 2 is a view of the load applying device seen in FIG. 1 but taken on line 2—2 of FIG. 1.

As seen in FIGS. 1 and 2, the load applying device 10 includes a stanchion portion 22 which supports a carriage 24 mounted on a slide assembly 26 which forms a part of the stanchion portion 22. The carriage 24 has a horizontally extending hydraulic cylinder 28 mounted thereon that serves to provide a controlled load onto the seatback portion 18 of the seat frame assembly 14 while the slide assembly 26 allows the carriage 24 to move along a vertical axis and a horizontal axis, as will be more fully explained hereinafter.

More specifically, the stanchion portion 22 includes a pair of laterally spaced and parallel upright post members 30 and 32, each of which is secured at its upper end to an angled strut 34 which, in turn, is secured at its lower end to the rear end of a base member 36. The lower ends of the post members 30 and 32 are rigidly fixed to the front end of the base member 36 which is anchored to the floor. A back plate 38 is secured to the post members 30 and 32 and serves as a support for the slide assembly 26 which includes a pair of horizontal and parallel cylindrical guide rails 40 and 42, a from plate 44, and a pair of vertically oriented and parallel cylindrical guide rails 46 and 48.

In this regard and as seen in FIGS. 1 and 2, the guide rails 40 and 42 are secured to the back plate 38 and serve to support bushing members 50 and 52, respectively, which are fixed with the rear surface of the from plate 44. In turn, the guide rails 46 and 48 are mounted on the front surface of the front plate 44 and serve to support bushing members 54 and 56 fixed to the carriage 24. Thus, it should be apparent that the front plate 44 and, accordingly, the carriage 24 is movable horizontally along the guide rails 40 and 42. In addition, the carriage 24 is movable vertically along the guide rails 46 and 48. It will also be noted that the weight of the carriage 24 and the hydraulic cylinder 28 is counterbalanced by a weight 57 which is connected by a cable 58 to the carriage 24. The cable 58 extends upwardly from the carriage 24 and is guided by a pair of sheaves 60 and 62 rotatably mounted on a bracket 63 which, in turn, is fixed to the upper end of the front plate portion 44 of the slide assembly 26. Thus, the carriage 24 is essentially weightless and can move freely along the guide rails 40, 42, 46 and 48 in both vertical and horizontal directions. In order to prevent the carriage 24 from leaving the guide rails 46 and 48 when moving in a downward direction, a stop member 64 is provided below the slide assembly 26. Similarly, stop members 66 and 68 are provided at the opposite ends of each of the guide rails 40 and 42 to limit the horizontal movement of the front plate 44 and, accordingly, the carriage 24.

Figure 3:
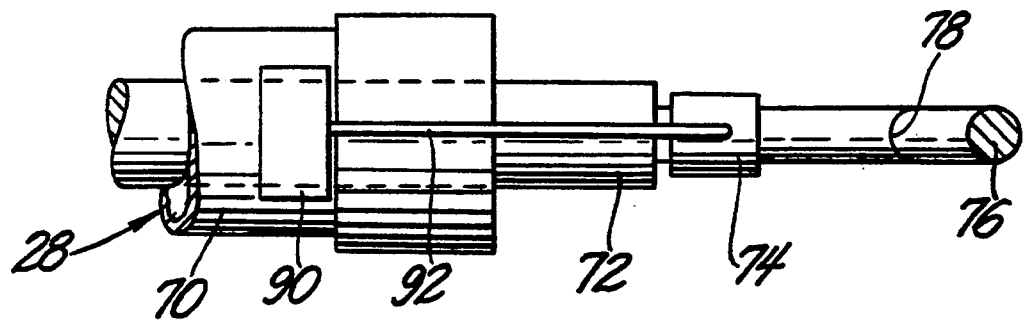
FIG. 3 is an enlarged view of the front end portion of the force applying member of the load applying device taken on line 3—3 of FIG. 1.

As seen in FIGS. 1 and 3, the hydraulic cylinder 28 includes the usual cylinder member 70 which houses a piston member, the rod end 72 of which extends out of the cylinder member 70 and, in this instance, is connected through a load cell 74 to the lumbar spine portion 76 of a Part 572 (FMVSS 208) or Hybrid III dummy 77 seated in the seat assembly 14. The attachment of the rod end 72 of the piston member is preferably at a point approximately 150 mm vertically above the H-point of the dummy. As is known to those skilled in the art, the H-point simulates the center of gravity of the human pelvis and is a point on the dummy defined in SAE J826. It will be noted that, as best seen in FIG. 3, the rod end of the piston is formed with a U-shaped slot 78 which contacts the lumbar spine 76 so that a swivel type connection is provided which permits the dummy to move or rotate in any direction without influence from the hydraulic cylinder 28 during the time that the latter is applying a horizontal force to the dummy 77. In addition, as seen in FIG. 1, the seat assembly 14 is secured in the design position to a plate 80 above two tri-axial load cells 82 and 83, the output of which permits the forces at the seat floor/pan interface to be determined. The load cells 82 and 83, in turn, are mounted on a plate which can be secured in position relative to the load applying device 10.

As seen in FIGS. 1 and 2, the position of the carriage 24 and, accordingly, the hydraulic cylinder 28 in space is provided by a pair of transducers 84 and 85 connected by wires 86 and 88, respectively, to the carriage 24 and the front plate 44. A transducer 90 is also provided on the cylinder member 70 that is connected by wire 92 to the rod end 72 of the piston member so that, during loading of the seatback portion 18, one can determine the amount of horizontal excursion of the piston into the seatback portion 18. In addition, the seat assembly is instrumented with two goniometers (one of which only is shown in FIG. 1 and identified by reference numeral 94) centered at both pivotal connections 20 of the seat assembly on opposite sides of the seatback portion 18. When the load applying device is activated, the goniometers 94 provide dynamic data on the angular rotation of the inboard and outboard sides of the seatback portion 18.

The seatback load applying device 10 described above operates as follows. First, the seat assembly 14 is anchored to the bedplate 80 in the design position, which is the position the seat assembly 14 would normally assume in the vehicle for which it was designed. A surrogate, such as the Part 572 dummy 77, is then placed in the seat assembly 14 in the seated position as seen in FIG. 1. The piston of the hydraulic cylinder 28 is drawn into the cylinder 70 as far as possible in order to provide a common and repeatable point of origin and also to assure that maximum piston travel is available if required. The entire test station 12, including the dummy 77, the seat assembly 14, including the plate 80 and the load cell supporting plate, are moved toward the rod end of the hydraulic cylinder 28 until the slotted end of the piston member makes contact with the lumbar spine portion 76 of the dummy 77. The test station is then fixed in position to the floor. The hydraulic cylinder 28 is then activated for its full piston travel. As the force of the hydraulic cylinder 28 is applied to the seatback portion 18 through the dummy 77, the seatback portion 18 is forced to pivot rearwardly about the pivotal connection 20. As the force of the hydraulic cylinder continues to apply a horizontal load to the dummy 77 while the seatback portion 18 is deflecting rearwardly relative to the seat portion 16, the dummy 77 will tend to move up the seatback portion 18 and thereby increase the moment on the pivotal connections 20 on opposite sides of the seat assembly 14. Thus, as the dummy 77 moves up the seatback portion, the load is applied at various points of the seatback portion 18 in order to obtain a more realistic application of occupant load to the seat assembly 14. At the same time, since the carriage 24 is weightless as explained above, the carriage 24 will tend to move along the guide rails 46 and 48 upwardly to maintain the force on the dummy 77 in a horizontal direction. At the end of the full travel of the hydraulic cylinder 28, the data from the load cells 74, 82, 83, the transducers or string potentiometers 84, 85 and 90, and goniometers 94 are output to a PC-based data acquisition system which organizes the data into a form applicable to the data analysis algorithm developed for this procedure.

Although not shown, it should be understood that the seat assembly 14 can be mounted at 90 degrees to the centerline of the hydraulic cylinder 28 or rotated 30 degrees to either side of the centerline so that forces can be applied to the dummy at an angle relative to the seatback portion 18, if desired. In addition, although the rod end of the hydraulic cylinder 28 is shown engaging the lumbar spine portion 76 of the dummy 77, the hydraulic cylinder 28 and the connection of the rod end of the piston to the dummy 77 can, if desired, have the load applied to the neck 96 of the dummy to assess the interaction of the upper body with the upper portion of the seatback portion 18 and the head restraint 19.

Various changes and modifications can be made in the device disclosed herein without departing from the spirit of the invention. Such changes and modifications are contemplated by the inventors and they do not wish to be limited except by the scope of the appended claims.

The embodiments of the invention in which an exclusive property or privilege is claimed are defined as follows:

1. A seatback load applying device for determining the deflection characteristics of a seat assembly which includes a seatback portion and cushion portion supported in a fixed position and having a dummy seated therein, said device comprising a stanchion, a carriage mounted on said stanchion for movement along a horizontal axis and a vertical axis, a longitudinally extendable force applying member having one end thereof mounted on said carriage and the other end thereof connected to said dummy, means connected to said carriage for counterbalancing the weight of said carriage and said force applying means, and means operatively associated with said carriage and said force applying member and also with said seat assembly for providing output signals for determining the deflection of said seatback in relation to the force applied to said dummy.

2. A seatback load applying device for determining the deflection characteristics of a seat assembly which includes a seatback portion and cushion portion supported in a fixed position and having a dummy seated therein, said device comprising a stanchion, a carriage mounted on said stanchion for free movement along a horizontal axis and a vertical axis, a hydraulic cylinder having one end thereof mounted on said carriage and the other end thereof connected to said dummy and located in a position so as to provide a horizontally directed force to said dummy, means connected to said carriage for counterbalancing the weight of said carriage and said hydraulic cylinder, and means operatively associated with said carriage, said hydraulic cylinder and said seat assembly for providing output signals for determining the deflection of said seatback in relation to the force applied to said dummy.

3. A seatback load applying device for determining the deflection characteristics of a seat assembly which includes a seatback portion and cushion portion supported in a fixed position and having a dummy seated therein, said device comprising a stanchion, a carriage, means mounting said carriage on said stanchion for movement along a horizontal axis and a vertical axis, a hydraulic cylinder having one end thereof mounted on said carriage and the other end thereof connected to said dummy and located in a position so as to provide a horizontally directed force to said dummy, said other end of said hydraulic cylinder being formed so as to provide a swivel-type connection with said dummy, means connected to said carriage for counterbalancing the weight of said carriage and said hydraulic cylinder so as to allow said carriage to move freely vertically upwardly and sideways to follow the position of the dummy when the seatback is pivoted rearwardly during application of said horizontally directed force to said dummy, and means operatively associated with said carriage, said hydraulic cylinder and said seat assembly for providing output signals for determining the deflection of said seatback in relation to the force applied to said dummy.

4. The seatback load applying device of claim 3 wherein a rod end of a piston of said hydraulic cylinder is formed with a U-shaped slot to form a part of said swivel connection.

5. The seatback load applying device of claim 4 wherein said dummy is provided with a lumbar spine portion which is generally round in cross section and to which said rod end of said piston is connected while said hydraulic cylinder applies said horizontally directed force to said dummy.

6. The seatback load applying device of claim 4 wherein a string potentiometer is mounted on said hydraulic cylinder for determining the position of the rod end of the piston relative to the cylinder member of the hydraulic cylinder.

7. The seatback load applying device of claim 3 wherein said means mounting said carriage on said stanchion includes a first plate member fixed to said stanchion and supporting a pair of vertically spaced, parallel, horizontally oriented guide rails, a second plate member mounted on said horizontally oriented guide rails for horizontal movement therealong, and a pair of laterally spaced vertically oriented and parallel guide rails supported on said second plate member.

8. The seatback load applying device of claim 7 wherein stop means are provided on said first plate member for limiting movement of said carriage in a horizontal direction.

9. The seatback load applying device of claim 7 wherein stop means are provided below said vertically oriented guide rails from limiting downward movement of said carriage.

10. The seatback load applying device of claim 3 wherein a pair of string potentiometers are mounted on said stanchion and are connected to said carriage for determining the location of said hydraulic cylinder in space.

* * * * *